United States Patent
Davis et al.

(10) Patent No.: US 7,209,571 B2
(45) Date of Patent: Apr. 24, 2007

(54) AUTHENTICATING METADATA AND EMBEDDING METADATA IN WATERMARKS OF MEDIA SIGNALS

(75) Inventors: Bruce L. Davis, Lake Oswego, OR (US); Geoffrey B. Rhoads, West Linn, OR (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 818 days.

(21) Appl. No.: 09/840,018

(22) Filed: Apr. 20, 2001

(65) Prior Publication Data
US 2002/0001395 A1    Jan. 3, 2002

Related U.S. Application Data

(63) Continuation-in-part of application No. 09/482,786, filed on Jan. 13, 2000, now Pat. No. 7,010,144, and a continuation-in-part of application No. 09/507,096, filed on Feb. 17, 2000.

(60) Provisional application No. 60/198,857, filed on Apr. 21, 2000.

(51) Int. Cl.
G06K 9/00 (2006.01)
H04L 9/00 (2006.01)
(52) U.S. Cl. .................... 382/100; 705/1
(58) Field of Classification Search ........... 382/100, 382/232, 264; 713/156, 176, 400; 707/205; 705/80, 26, 1; 380/53, 54; 375/240.26; 386/101; 396/312, 315; 430/140; 704/501; 358/3.28
See application file for complete search history.

(56) References Cited

U.S. PATENT DOCUMENTS

| | | | |
|---|---|---|---|
| 5,337,362 A | | 8/1994 | Gormish et al. |
| 5,379,345 A | | 1/1995 | Greenberg |
| 5,425,100 A | | 6/1995 | Thomas et al. |
| 5,499,294 A | | 3/1996 | Friedman |
| 5,539,586 A | * | 7/1996 | Inoue et al. ............ 386/101 |
| 5,617,119 A | | 4/1997 | Briggs et al. |
| 5,646,997 A | | 7/1997 | Barton |
| 5,737,025 A | | 4/1998 | Dougherty et al. |
| 5,774,752 A | * | 6/1998 | Patton et al. ............ 396/312 |
| 5,842,063 A | * | 11/1998 | Hawkins et al. ......... 396/315 |
| 5,850,249 A | | 12/1998 | Massetti et al. |
| 5,857,038 A | | 1/1999 | Owada et al. |
| 5,862,217 A | | 1/1999 | Steinberg et al. |
| 5,862,218 A | | 1/1999 | Steinberg et al. |

(Continued)

FOREIGN PATENT DOCUMENTS

EP    952728    10/1999

(Continued)

OTHER PUBLICATIONS

U.S. Appl. No. 60/198,857, filed Apr. 21, 2000, Davis et al.

(Continued)

*Primary Examiner*—Duy M. Dang (57) ABSTRACT

A steganographic embedder associates data with a media signal by encoding the data, a link to the data, or a combination of both into the media signal. The embedder may be located in an media signal capture device or an external process or device.

21 Claims, 3 Drawing Sheets

U.S. PATENT DOCUMENTS

| | | | |
|---|---|---|---|
| 5,889,868 | A | 3/1999 | Moskowitz et al. |
| 5,943,093 | A | 8/1999 | Anderson et al. |
| 5,944,833 | A * | 8/1999 | Ugon .................... 713/400 |
| 6,005,613 | A | 12/1999 | Endsley et al. |
| 6,005,936 | A | 12/1999 | Shimizu et al. |
| 6,005,972 | A | 12/1999 | Fredlund et al. |
| 6,006,039 | A | 12/1999 | Steinberg et al. |
| 6,122,403 | A | 9/2000 | Rhoads |
| 6,167,395 | A | 12/2000 | Beck et al. |
| 6,177,956 | B1 | 1/2001 | Anderson et al. |
| 6,180,312 | B1 * | 1/2001 | Edwards ................... 430/140 |
| 6,188,987 | B1 * | 2/2001 | Fielder ..................... 704/501 |
| 6,226,618 | B1 * | 5/2001 | Downs et al. ................. 705/1 |
| 6,233,347 | B1 | 5/2001 | Chen et al. |
| 6,243,480 | B1 | 6/2001 | Zhao et al. |
| 6,272,176 | B1 | 8/2001 | Srinivasan |
| 6,304,345 | B1 | 10/2001 | Patton et al. |
| 6,487,301 | B1 * | 11/2002 | Zhao ......................... 382/100 |
| 6,496,933 | B1 | 12/2002 | Nunally |
| 6,499,105 | B1 | 12/2002 | Yoshiura et al. |
| 6,504,941 | B2 | 1/2003 | Wong |
| 6,505,160 | B1 * | 1/2003 | Levy et al. ................. 704/270 |
| 6,523,172 | B1 * | 2/2003 | Martinez-Guerra et al. .. 717/143 |
| 6,549,922 | B1 * | 4/2003 | Srivastava et al. .......... 707/205 |
| 6,571,222 | B1 * | 5/2003 | Matsumoto et al. .......... 705/80 |
| 6,611,607 | B1 * | 8/2003 | Davis et al. ................ 382/100 |
| 6,611,812 | B2 * | 8/2003 | Hurtado et al. ............... 705/26 |
| 6,678,332 | B1 * | 1/2004 | Gardere et al. ........ 375/240.26 |
| 6,683,966 | B1 * | 1/2004 | Tian et al. .................. 382/100 |
| 6,968,564 | B1 | 11/2005 | Srinivasan |
| 2001/0026618 | A1 | 10/2001 | Van Wie et al. |
| 2001/0031066 | A1 * | 10/2001 | Meyer et al. ............... 382/100 |
| 2001/0049788 | A1 | 12/2001 | Shur |
| 2002/0001395 | A1 | 1/2002 | Davis et al. |
| 2002/0051577 | A1 | 5/2002 | Kinjo |
| 2002/0072935 | A1 | 6/2002 | Rowse et al. |
| 2002/0082922 | A1 | 6/2002 | Van Zoest et al. |
| 2002/0120849 | A1 * | 8/2002 | McKinley et al. .......... 713/176 |
| 2002/0122568 | A1 * | 9/2002 | Zhao ........................ 382/100 |
| 2002/0194480 | A1 * | 12/2002 | Nagao ....................... 713/176 |
| 2003/0011684 | A1 | 1/2003 | Narayanswami et al. |
| 2003/0012403 | A1 * | 1/2003 | Rhoads et al. ............. 382/100 |
| 2003/0093790 | A1 * | 5/2003 | Logan et al. ................. 725/38 |
| 2003/0103645 | A1 * | 6/2003 | Levy et al. ................ 382/100 |
| 2003/0126432 | A1 * | 7/2003 | Tonisson .................... 713/156 |

FOREIGN PATENT DOCUMENTS

| | | |
|---|---|---|
| EP | 1001604 | 5/2000 |
| WO | WO9626494 | 8/1996 |
| WO | WO9817052 | 4/1998 |
| WO | WO9817059 | 4/1998 |
| WO | WO9818258 | 4/1998 |
| WO | WO9914936 | 3/1999 |
| WO | WO00/36605 | 6/2000 |
| WO | WO0033282 | 6/2000 |
| WO | WO00/39953 | 7/2000 |
| WO | WO0039954 | 7/2000 |

OTHER PUBLICATIONS

U.S. Appl. No. 09/482,786, filed Jan. 13, 2000, Davis et al.

U.S. Appl. No. 09/507,096, filed Feb. 17, 2000, Davis et al.

Bassali et al., "Compression Tolerant Watermarking for Image Verification," IEEE Proc. Int. Conf. on Image Processing, vol. 1, Sep. 2000 pp. 434-437.

Epson Image Authentication System, Frequently Asked Questions, Oct. 5, 1999, 3 pages.

Friedman, "The Trustworthy Digital Camera: Restoring Credibility to the Photographic Image," IEEE Transactions on Consumer Electronics, vol. 39, No. 4, Nov. 1993, pp. 905-910.

Schneider et al., A Robust Content Based Digital Sig Proc. Int. Conf. on Image Processing, Sep. 16-19, 1996, Part vol. 3, pp. 227-230.

Toyokawa et al., "Secure Digital Photograph Handling with Watermarking Technique in Insurance Claim Process," Security and Watermarking of Multimedia Contents II, Proc. of SPIE, vol. 3971 (2000), pp. 438-445.

Walton, "Image Authentication for a Slippery New Age," Dr. Dobb's Journal, Apr. 1995, pp. 18-26, 82-87.

Zhao, "A WWW Service to Embed and Prove Digital Copyright Watermarks," In Proc. of the European Conf. on Multimedia Applications, Services and Techniques, Louvain-La-Neuve, Belgium, May 1996, 14 pages.

"The Power of Metadata is Propelling Digital Imaging Beyond the Limitations of Conventional Photography," The Digital Imaging Group's DIG35 Initiative, Aug. 1999, 7 pages.

Wingfield, "FlashPoint Helps Beam Photos Onto the Web," Wall Street Journal, Dec. 23, 1999, 1 page.

Okon, "Keeping Up Multimedia Asset Value," Advanced Imaging, Jul. 1997, pp. 42-43.

"Coding of Still Pictures," ISO/IEC/JTC 1/SC 29/WG 1 (ITU-SG8), Digital Imaging Group, 9 pages.

"The Platform for the Future of Digital Imaging," Digital Technical Overview, Flashpoint Technology, Inc, downloaded Jan. 1, 2000, 5 pages.

* cited by examiner

Metadata returned directly to application (or indirectly through the metadata server of the application)

AUTHENTICATING METADATA AND EMBEDDING METADATA IN WATERMARKS OF MEDIA SIGNALS

RELATED APPLICATION DATA

This patent application is a continuation-in-part of Ser. No. 09/482,786 filed Jan. 13, 2000, now U.S. Pat. No. 7,010,144, and Ser. No. 09/507,096 filed Feb. 17, 2000, which are hereby incorporated by reference. This patent application also claims the benefit of U.S. Provisional Application 60/198,857, filed Apr. 21, 2000.

FIELD OF THE INVENTION

The invention relates to encoding and authenticating data associated with media signal objects like images, audio, computer generated graphics, video, etc.

BACKGROUND AND SUMMARY OF THE INVENTION

For many applications, it is useful to associate data (metadata) with media signals. Some examples include associating the owner of an image with the image, or associating a picture with a song. One problem is maintaining the association between various types of processing on the media signal or its metadata.

The following disclosure describes several methods, devices and applications for processing metadata, including but not limited to, technology to embed metadata in a media signal, and technology to process metadata that will be or has been embedded in the media signal.

The invention provides methods of processing metadata of media signals such as audio, video and still image signals. These methods persistently associate metadata for a media signal by steganographically embedding metadata into the media signal. Steganograhic embedding inserts the metadata into the content of the signal itself by subtly altering the media signal such that the alterations are imperceptible or substantially imperceptible to the viewer or listener when the signal is rendered. A specific form of steganographic embedding is digital watermarking.

The invention provides various methods for processing the steganographically embedded metadata. For example, images and video are embedded with metadata in the form or compressed voice data. Also, a metadata digest, including descriptors of metadata stored externally, are embedded into the media signal. The metadata digest comprising descriptors of the metadata is extracted and displayed to show the types of metadata associated with a media signal. The user can then select a link to metadata from among the displayed descriptors.

The embedded metadata may be used to authenticate other metadata associated with the media signal in which it is embedded. One aspect of the invention is a method for embedding a metadata signature, such as a hash of external metadata stored outside the media signal, into the media signal itself. The external metadata is located outside the content, such as in a file header or remote database. The external metadata is authenticated by computing a hash, and comparing this hash with the hash of the metadata extracted from the data embedded in the media signal.

The embedded metadata may also include time and location stamps to mark the media signal with a time and location when certain processing events occur. These processing events include editing the media signal or transferring the media signal from one device to another.

Further features will become apparent with reference to the following detailed description and accompanying drawings.

DETAILED DESCRIPTION

Introduction

There are many applications for associating auxiliary data with media signals captured in a media signal capture device such as a camera, scanner, audio recorder, three-dimensional model capture system, etc. A short list of these applications include:

managing copyrights,
authenticating the media signal,
describing objects within an image or other media signal,
describing the context of the image or other media signal (time, place, subject, camera properties),
facilitating media object searching based on content,
uploading and organizing media signal objects from capture devices in library databases,
sharing media signals over networks, such as the Internet
linking derivative media signals to originals.

The following sections describe various implementations of image capture devices and related systems that associate various forms of data with images. The sections discuss associating data in images using steganographic and other techniques. Later sections describe how the similar technology may be used to associate data in other media signal types, including but not limited to audio signals.

Steganographic methods can encode data in an image, including identifiers and references that associate the image with additional data stored outside the image itself. In some applications, the capacity of the images to hold a steganographic signal, such as an imperceptible watermark, is sufficient to store the data associated with the image. In other applications, it is useful to store additional data elsewhere, and refer to it through a reference hidden in the image.

One way to associate data with an image is to store the data in the image container (e.g., a file), but outside the image. Yet another way is store the data in a location external to the image file, and create an association between the image file and the external data. In this case, the image may be associated with the external data via a reference encoded in the image itself or in the image file that refers to the external data. Data associated with a digital object, such as an image, is sometimes referred to as "metadata."

In some applications, the image capture device enables users to specify the types of data as well as specific items of data to be associated with images captured in it. The data "type" describes what a data item represents, while the data "item" refers to the actual data associated with the image.

Some examples of data types include the time, place, and subject of the image, and examples of corresponding data items include: 12:30 PM, Times Square, Mom (corresponding to data types of time, place and subject).

The user may specify the data types through the user interface of the image capture device, or through the user interface of an external device or system, which in turn, communicates the desired data types to the image capture device. Camera user interface components, such as buttons or voice recognition modules, enable the user to change settings of the device anywhere, without the need to link it to external device. Data entry and device configuration through external devices, such as a personal computer, personal digital assistant or phone, provides a number of advantages, including remote control of the camera, access to more user friendly user interfaces, and more powerful data manipulation and storage than is capable on the camera.

In addition to specifying the data type, the user may also specify actual data items to be associated with images. Again, the user may specify the data items through the user interface of the image capture device, or through the user interface of an external device. In cases where the user supplies data items to the external device, these items may be downloaded to a storage device on the image capture device, associated with images at the time of or after image capture, and later transferred from the device along with the associated images to external storage. Alternatively, the data items may be kept in storage external to the image capture device and associated with selected images by reference, such as through an identifier that matches an identifier hidden in the image. For example, the camera or some other image management system can insert a steganographic link (e.g., in an image watermark) that associates the image with the desired data items.

Image Capture Devices and Connectivity to External Devices and Systems

The methods and systems for associating data with images can be implemented in many different types of image capture devices, including conventional film cameras, digital cameras and scanners. To simplify the discussion, the following description uses digital cameras as an example of one type of image capture device.

Digital Cameras

Figure 1:
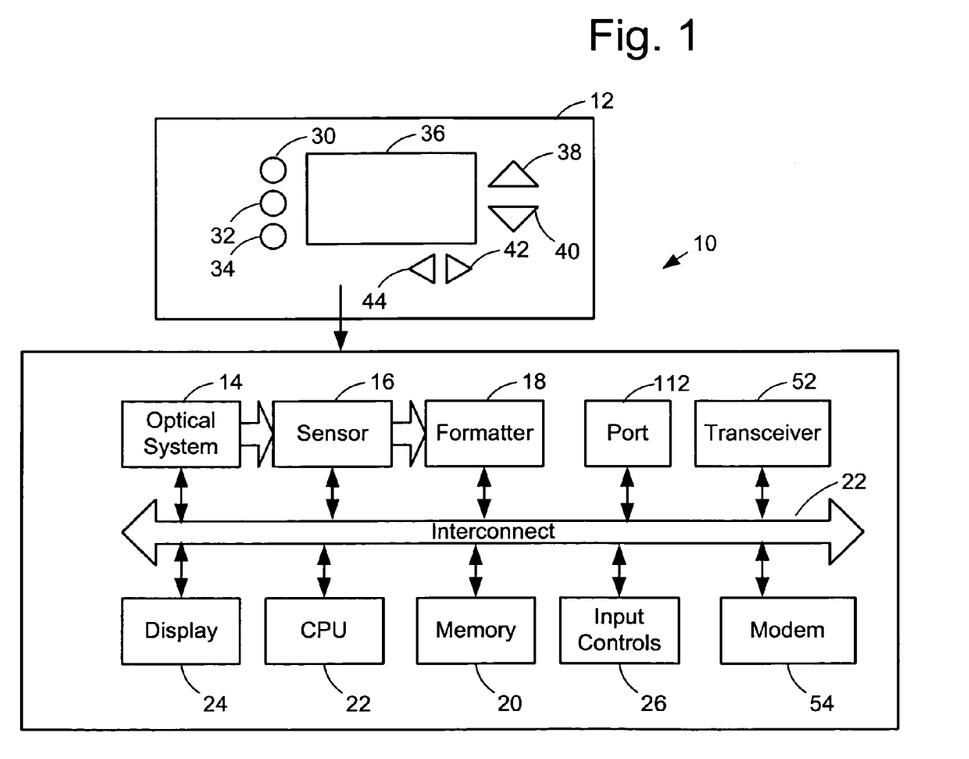
FIG. 1 is a block diagram illustrating an example of a digital camera.

The design of digital cameras is well understood to those skilled in the art, so is not belabored here. FIG. 1 shows an example of a camera 10, including its user interface 12 and its internal architecture.

The camera 10 includes an optical system 14, an image sensor 16, and an image formatter 18. The optical system contains the camera's lens, focus control, and other optics components that control the transfer of light to the camera's sensor 16. The sensor is comprised of an array of discrete sensor elements arranged in clusters sensitive to three primary colors (e.g., red, green, blue). Two common types of sensors are CCD and CMOS sensors. The image formatter includes an analog to digital converter to convert signals from the sensor elements to digital form. It also includes a color space converter to map the signal into a desired color space, such as RGB or YUV. The formatter transforms the image signal into a form suitable for further processing and storage and stores it in the camera's memory subsystem.

Because the specific interconnect varies with the implementation, FIG. 1 depicts a general interconnect 22 that represents the data and control path among various components in the camera. In addition to the image capture components described above, the camera includes a processing unit 22, a memory subsystem 20, and various I/O devices. The camera may include one or more processing devices, such as a microprocessor, and a DSP.

The processing unit executes an operating system, such as VxWorks real time embedded operating system in the Digita Operating Environment from Flashpoint, Inc., or Windows CE from Microsoft Corporation. Application programs supporting functions described throughout this document may be developed using software development environments designed for these and other commercially available operating systems, such as Tornado Tools from Wind River.

A steganographic embedder may be implemented as an application program that executes on the processing unit, or in special purpose hardware that has access to the memory subsystem.

The memory subsystem 20 includes a combination of ROM, RAM, and removable storage devices such as a flash memory card.

The I/O devices include a display 24, and input controls 26. The upper portion of FIG. 1 depicts an example of the rear panel of the camera showing user interface components on the camera. The panel has buttons and switches 30, 32, 34 that control operating modes of the camera and display modes on the display screen 36. It also includes scroll buttons 38–44 that enable the user to scroll through options on various display screens.

The camera is equipped with one or more external interfaces to transfer images, image related data, and operating parameters to and from external devices. The type and number of interfaces for external connectivity vary from camera to camera, and include:

ports 50 for wire connections to external devices such as serial ports, USB ports, parallel ports, PCI, Firewire or Ilink ports (IEEE 1394 and USB2 ports), and transceivers and receivers 52 for wireless connections such as an infrared transceiver, RF transceivers (Bluetooth transmitter/receivers), FM receivers, etc.

The camera may also include a cellular or conventional modem 54 for transferring data to and from a telephone network. In addition to transferring images and data via connections to external devices, the camera can also receive and send data via a removable memory device.

Connectivity to External Devices

The camera's connectivity features enable it to upload images and data to external devices, and enables external devices to download operating parameters and image related data (e.g., image metadata). There are numerous connectivity configurations, including wired and wireless connections to stand-alone and networked devices.

Figure 2:
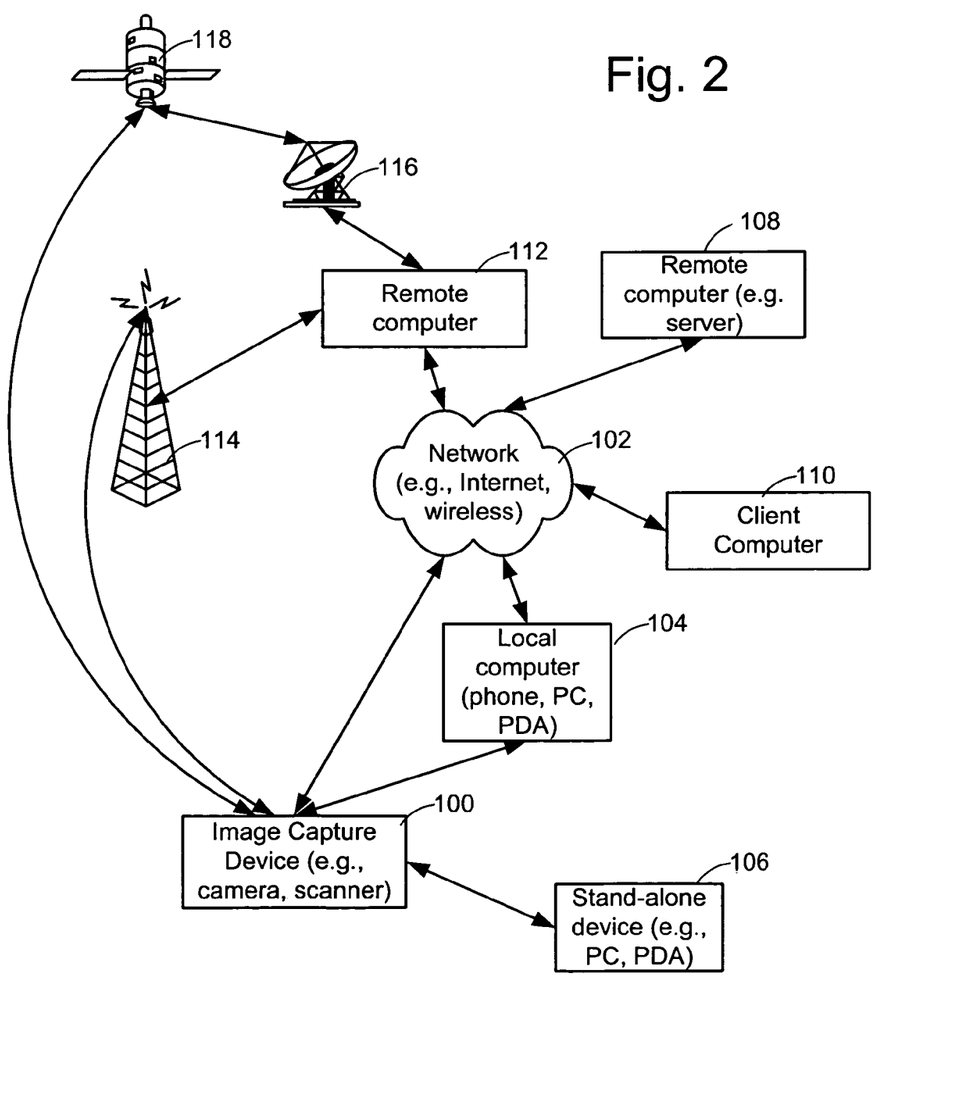
FIG. 2 is a block diagram illustrating various connectivity configurations for transferring data to and from an image capture device.

FIG. 2 is diagram illustrating some examples of configurations for connecting the camera with external devices. As shown, the camera 100 may connect directly to a communication network 102, like the Internet, it may connect to a networked device such as a personal computer or telephone (104), and finally, it may connect to a stand-alone device 106.

In order to connect to a network, the camera may have a cellular or conventional modem or a network adapter. It may be connected to a networked or stand-alone device via a communication interface such as the ones mentioned in the previous section.

FIG. 2 highlights some of the connectivity scenarios made possible by these connectivity components in the camera. The connectivity scenarios can be grouped into two principle categories: 1) transferring data and operating parameters to the camera; and 2) uploading images, data associated with the images, and operating parameters from the camera.

Transfers to the Camera

One configuration is to transfer the desired information through a direct connection to the camera, such as through the camera's serial port, USB port, parallel port, Firewire or Ilink port, infrared transceiver port, or RF transceivers port. In this scenario, the source of the information may be a networked or stand-alone device.

Another configuration is through an indirect connection from the source of the information to the camera. The indirect connection may include one or more hops through a wired or wireless connection. An example of a wired connection is where the camera 100 is connected to a network 102, such as the Internet, and another device, such as a server 108, sends the information through the network to the camera, which is connected to the network. A useful application of this configuration is where a user of a client computer 110 designates operating parameters and metadata through an interactive web site. The web server 108, in turn, transfers the operating parameters and metadata to the camera through the network 102.

Another related configuration is where a user specifies desired parameters to a server computer 112, which in turn, sends the data to the camera through a wireless connection or broadcast. One example of a wireless connection is through wireless network to a cellular modem in the camera. Example of a wireless broadcast include transmitting the data from the server to a FM transmitter (e.g., the radio tower 114) or satellite transmitter (116, 118) to a compatible receiver in the camera.

Uploading Data from the Camera

Many of the same configurations outlined above for transferring data to the camera apply to uploading data from the camera as well. However, as practical matter, cameras have more limited resources to process and transmit data. One way to address these limitations is to incorporate into the camera a high bandwidth interface to transfer large amounts of data, such as the images and their related metadata, as well as a low bandwidth interface for transferring smaller packages of data, such as an identifier or set of control signals. The high bandwidth interface may be implemented using a port that can communicate large amounts of data efficiently, without unduly complicating the circuitry on the camera. Examples of such ports include a USB, firewire or Ilink port (IEEE 1394 and USB2). The low bandwidth interface may be used to implement a wireless signal transmitter, such as cellular modem transceiver, or other wireless signal transmitter, such as FM, RF, infrared, etc.

Image Data Configuration

As noted above, there are two principle categories of methods for configuring the camera to specify its operating parameters, and to specify the types of auxiliary data to be associated with images: 1) through the user interface of the camera; and 2) through an external device. The following sections provide examples of devices for configuring the camera and methods of operating these devices.

Camera UI

The camera UI may be implemented with many different combinations of input and output devices. The input devices may be implemented using combinations of hardware controls, such as buttons, switches, dials, cursor control devices, etc., and soft controls, such as touch screens, soft buttons, scroll bars, and check boxes displayed on a display device. The camera may also be configured to receive voice input through a microphone, voice codec, and voice recognition hardware and software.

Similarly, the output devices may produce visual and/or audio output. For example, the camera may have a display screen, with or without support for video output. In addition, it may have audio output, and allow for playback of voice instructions, and output of a text to speech synthesis system.

In the example depicted in FIG. 1, the user manipulates the user interface (FIG. 1) to specify the data that is to be associated with a picture or series of pictures. The user may specify the data type to be associated with a picture, and then allow the camera to supply the actual data from its storage or from an internal device (e.g., clock for the time, GPS for the location, etc.). The data in the storage device may, for example, be downloaded to the camera from an external source. Additionally, the user may specify the actual data to be associated with each picture, either in advance, or as he snaps the pictures. For example, the photographer might enter his name, and the names of the people or things in the picture. The photographer may opt to enter the data once, and then have it linked to several pictures in a virtual roll. A virtual roll is a set of images that constitutes a "roll."

In one particular implementation depicted in FIG. 1, the user interface accepts user input via the buttons 30–34. Using known UI techniques, the user can use the scroll buttons 38–44) to scroll through a list of selections displayed on display screen 36 until a desired selection is presented. Once the list has been scrolled to the desired entry, the user can actuate a second button (e.g., 32–34) to effect that selection. The data types associated with an image or set of images can be of various classes. One class can identify the photographer, another class can identify the subject, etc.

For the class of photographers, the scrollable list of selections can include a default list of descriptors (e.g., Mom, Dad, Child1, Child2, #1, #2, etc.), supplemented (or replaced if desired) by a list that is customized by the owner of the camera (e.g., Bill, Kristen, Hannah, David, etc.).

The class of subjects can similarly include a default list (e.g., Birthday, Vacation, Anniversary, Wedding, House, Car, Pet, etc.) and/or a customized list (Uncle Harry, Yellowstone, Mushrooms, Seascapes, etc.) The user interface for selection of subjects may permit selection of several subjects—providing alternate descriptors for an image. A descriptor selected by the user can be used to encode the picture just-snapped, or can be used to encode pictures thereafter-snapped. A descriptor embedded in the image may be in the form of text, or a number that refers to metadata stored outside the image.

Rather than having a cumbersome interface built into the camera, the camera may support one or more plug-in user interface peripherals, such as a keyboard. Alternatively, the configuration data in the camera may be synchronized with configuration data in an external device via a wire or wireless connection.

In some applications, the photographer may be intentionally precluded from controlling the data associated with pictures. This feature is important in applications where there is concern that the photographer might tamper with the metadata associated with an image. For example, the photographer might try to alter the time, place or subject to create a false or misleading photographic record. To prevent such tampering, the photographer's employer or supervisor can set the operating parameters and make data type selections from an external source. Operating parameters may be used to set certain types of data, such as the time, or to disable the photographer's ability to change certain parameters.

In order to implement such features, the camera supports a variety of different operating modes. In a session mode, the camera operates under the control of parameters that govern that session. The operating parameters for the session may be established through the user interface of the camera, or from an external device. In addition, the user may initiate a session, or an external device may initiate the session.

When the camera receives the operating parameters for the session, it makes all settings to comply with the instructions specified in the operating parameters. For example, if the session parameters instruct the camera to set the time, date, place or subject for the session, the camera does so. The session parameters may also specify that the user is to be precluded from altering the operating parameters for the duration of the session. For example, the user may be precluded from altering data items or data types associated with images snapped during the session or from altering certain camera functions, such as a time keeping function, a GPS function, etc. during the session.

The duration of the session may be set and measured using certain operating parameters. For example, the session may be in effect for specified period of time, for selected number of images, for selected GPS locations within a defined range, etc. In addition, the session duration may be specified in terms of certain events, such as a configuration event in which the session is configured, and an upload event, where the images snapped during a session are uploaded from the camera. Using this approach, the one configuring the camera can specify that the session shall extend from the configuration event to some other event, such as the act of uploading the images in the session.

The camera can be programmed to operate according to the parameters that govern the session. It may disallow the user from capturing images when the camera travels outside a particular location specified in the session parameters and monitored by the GPS unit within the device. Similarly, it may disallow the user from capturing images outside a predetermined time interval specified in the session parameters. To this end, the camera has a time clock that keeps time and is synchronized to a master clock to avoid errors that might occur due to user tampering or traveling through different time zones. The time clock can be set permanently to run synchronized with a master clock or can be periodically synchronized by an external master clock via a wire or wireless connection. Just as the parameters can prevent certain actions outside a given time span or geographic area, they can also selectively allow certain actions within a given time span or area. In addition, the time clock and GPS unit can be used to insert or link a time and place stamp to every image that is captured during a session or otherwise.

The session parameters can govern when and where the images are steganographically marked and uploaded. For example, the parameters may specify that the images are to be steganographically marked at the time of image capture, or at some later time. Similarly, the parameters may specify that the images are to be steganographically marked at the location of image capture or some other location (within some geographic region), as determined by the GPS unit within the device. Similar parameters may be established to specify a time or time range for when the image or images may be uploaded to an external storage device or processor.

A session may be tracked and associated with session related metadata by a session identifier encoded in the image, the image file, or its metadata. For example, the session identifier may be a number or message embedded steganographically in the image or metadata associated with the image.

Configuration via External Devices

As noted in previous sections, the data to be associated with images may be provided by an external device. The external device may set operating parameters that control the operation of the camera, including how and what data it associates with images. The external device may also set the data types as well as the actual data to be associated with images in the camera.

In some applications, a computer can be programmed to perform this function automatically for one or more cameras. For example, a server may be programmed to broadcast operating parameters and data to several cameras in the field.

In other applications, a user may enter the desired operating parameters and data to be associated with the images in the camera. In client-server scenario, for example, a user of a client device may submit desired operating parameters and data to server, which in turn, sends the information to the camera. In an alternative scenario, the user can enter this information via an application program executing on his PC, or PDA, and then instruct the application to download the information to the camera via a direct wire or wireless connection to the camera.

Image Data Sources

The data associated with images in the camera may come from a variety of sources. One source of data is the camera UI. Another source is the internal components and peripherals of the camera, such as a time clock, GPS device, camera components, camera software, etc. Yet another source is an external device. In this case, the camera will either have the data in its memory, after receiving it from the external source, or the camera will have a reference to data, which is stored on external device. As detailed further below, the reference may be an pointer, address or some other form of identifier that is encoded in the image.

Storage of Data Types and Data Items Associated with Images

A related design issue is where to store the data associated with an image at various stages of image processing. These stages include: 1) before configuring the camera; 2) after configuring, but before snapping the picture; 3) after snapping, but before transferring the associated image from the camera; and 4) after transferring the image from the camera.

Before Configuring the Camera

Before configuring the camera, the data types and data items to be associated with images may be stored in the camera or in one or more external storage devices, depending on the application.

The camera may maintain data types and items within the memory subsystem built into the camera (e.g., ROM or RAM) or within removable memory devices, such as a floppy disk, flash memory card etc. In some implementations, the camera maintains a set of data types that a user, application program or device may select to associate with images. A user can select from among these desired data types from the user interface of the camera or from an external device.

In applications for external configuration, a user, device or application program may maintain this data in memory of a computer, such as personal computer, personal digital assistant, server on the Internet, etc.

After Configuring the Camera

After configuring the camera, selected data types and items to be associated with images may be stored in camera memory, or in external storage. In either case, the camera maintains an association between the images to be captured and the data to be associated with those images. In cases where the image metadata is stored externally, the camera maintains a reference to the external data, such as an identifier number, pointer, or address.

After Capturing A Target Image

After capturing a target image in the camera, the camera may store data items associated with the image in the image itself through steganographic encoding, in the image file, outside the image file but within camera memory, and in external storage. The "target" image refers to the image that is associated with selected data types and data items. In the last two cases, the camera maintains a reference between the target image and the associated data. The reference may be encoded in the image steganographically or in the image file.

After Transferring the Image from the Camera

After transferring the image from the camera, the options for storing the data associated with the target image remain the same, yet the camera or some external device or process may transfer the data from one location to another. For example, an external steganographic encoder can embed some of the data in the image. In addition, an external process or device can transfer data to or from the image metadata in the image file. Image data stored externally may be transferred from one database, e.g., a configuration database, to another database, e.g., an image library or metadata database. For example, upon uploading an image to an image database, the uploading process can signal the configuration database to transfer image related data to the image or metadata database.

Associating Image Data with Images

The previous sections highlighted several methods for associating data with images. These methods include: steganographic encoding data in the image, storing the data within the image file (outside the image), storing the data outside the file and associating this external data with a reference stored in the file or encoded in the image. The following sections describe examples of these methods in more detail.

Embedding Auxiliary Data within an Image Using Steganographic Methods

The art of hiding auxiliary data into still and moving images is relatively advanced. Most techniques make slight changes to the image—e.g., by changing data representing the image, whether in the form of DCT coefficients, wavelet coefficients, pixel values, or other interchangeable representation—to thereby encode the auxiliary information. The changes are so slight as to be essentially imperceptible to the human visual system. Exemplary watermarking techniques are shown in U.S. Pat. No. 5,841,886 to Rhoads and U.S. Pat. No. 5,915,027 to Cox.

For additional information about a digital watermarking form of steganographic embedding and reading, see co-pending U.S. patent application Ser. No. 09/503,881, entitled WATERMARK EMBEDDER AND READER filed Feb. 14, 2000 by Rhoads et al., which is hereby incorporated by reference. The above references describe how to embed auxiliary information steganographically in various media objects, including still image, video and audio signals.

The steganographic encoder may be located within the camera or in external process or device. In either case, the encoder can be implemented in software, hardware or a combination of both.

An encoder implementation in the camera operates on images stored in the camera's memory system. For each image, the encoder converts auxiliary data to be embedded in the image into watermark signal and combines the watermark signal with the image. This auxiliary data may include one or more references, a machine instruction or set of instructions, and other data items about the image. A reference is a data item, such as identifier number, address or pointer. It may be used to identify the image and reference additional data related to it.

The camera-based encoder obtains auxiliary data to be embedded in an image from memory, or some other device in the camera. Recall that during configuration of the metadata, the user or some external device or process specifies the data types and data items to be associated with images. At encoding time, the encoder retrieves data designated for embedding in the image, converts it into a watermark signal and combines it with the associated image. To reduce the amount of data embedded in the image, the encoder may embed one or more references that identify data associated with the image that is stored outside the image.

There are many places to implement the encoder outside the camera. In one implementation, the encoder is implemented as part of a process for uploading the image from the camera. In this implementation, the data for embedding in the image may come from the camera, an external device, or a combination of both. During the configuration stage, a configuration process specifies that data to be associated with image, including any data to be embedded in the image. As explained above, this data may be stored on the camera or an external device. The uploading process transfers the images from the camera, along with any data associated with the images.

As part of the uploading process, an encoder then encodes auxiliary data designated for embedding in the image into the image. As in the camera-based process, this auxiliary data may include one or more references that associates the image with other auxiliary data stored outside the image. This type of reference avoids the need to transfer metadata into the camera. Rather than transfer such data into the camera, metadata may be configured and maintained on an external device, and referenced to the image via a reference encoded into a watermark in the image. Conversely, the uploading process may move data associated with an image from the camera, store it in a metadata database, and reference the entry in the database via a reference encoded in the watermark.

Embedding Auxiliary Data in the Image File

The camera, or an external process, may also embed auxiliary data in the image file, but outside the image. To support this type of association, the image is stored in a file format that allows metadata to be stored in the file along with metadata. For example, the format may specify that the data is to be stored in the file header. This approach of associating data with an image has advantages, but is more susceptible to intentional or unintentional manipulation.

In this case, a reference embedded in the image can be used to correlate the image with the correct metadata. This is particularly useful in applications where the metadata is placed in the image file by a process external to the camera. In these cases, it is possible that the metadata may be improperly assigned to a particular image. In addition, various image processing applications may remove or alter the image metadata stored in the image file. The data steganographically embedded in the image can be used to authenticate the metadata stored in the image file. One form of authentication is to match a reference number embedded in the image with a reference number in the image file metadata. More sophisticated forms of authentication may be implemented as well.

For example, both the number in the file metadata and the watermark may be encrypted. Also, the number may be a digital signature derived from the image, such as by performing a hash function on the image sample values. The digital signature has the added advantage that it can be used to determine whether the image has been modified. For additional security, the digital signature can be encrypted, and then embedded in the watermark and placed in the image file metadata.

Maintaining Auxiliary Data Separate from the Associated Image

As noted above, the auxiliary data associated with the image can be maintained separately from the image. A reference to this external, auxiliary data may be embedded in the image (e.g., in a watermark), in the image file metadata, or both.

Data Types

The types of data that can be associated with an image are numerous and vary with the application. The image data framework described above supports a variety of different data types, including:

who took the picture (the photographer, who or what is the subject of the picture, where was the picture taken (e.g., entered by user, or provided by GPS device), when was the picture taken (e.g., date and time of day), how was the picture taken, including camera specifications such as brand, model, manufacturer, and type of color converter, lens, sensor, flash, etc.

picture specific device data, including shutter speed, flash used, camera settings, focus, distance of subject from camera, resolution of image, light levels, why was the picture taken? entertainment, legal record, medical record, real estate, business transaction record, etc.

image type, copyright conditions, copyright owner and owner of copy, view data—the camera location and subject location, comment—e.g., user comment picture identifiers, e.g., industry or application specific identifiers, collection data, including collection ID, collection caption, collection members, Image quality parameters, Color profile, Image integrity—Digital signature, encryption key (e.g., public encryption key), Sound annotation, or reference to sound annotation, Language specifier, for elements of the metadata, view region—Advanced Photo System Print Aspect Ratio (PAR) selections of conventional, HDTV, and panoramic, user address, e.g., email or physical address, reference to derivative work—parent image and its derivatives, reference to alternative images—e.g., alternative view, color space, resolution, etc.

region specification—describe a region in a picture, e.g., the pixels that represent an object in the picture, compression format of image, compression format of image data (e.g., compression format of image metadata), encryption type of the image, and the image data (encryption of image metadata), references to other information (e.g., pointers, network links or addresses, phone numbers, etc.)

machine instructions or sets of instruction, e.g., instructions that control rendering of the image, that disable or enable certain types of editing operations, that control compression, decompression operations, etc.

Metadata Applications that Exploit Steganographic Data

Steganographic encoding of data enhances existing applications of image metadata and enables a variety of novel applications. The following sections describe some of these applications.

Persistent Steganographic Data and Metadata Servers

Steganographic encoding of auxiliary data in an image enables persistent linking of the image to its metadata. Metadata that is stored within an image file, yet outside the image, is vulnerable to intentional and unintentional manipulation. Whenever an application or device processes the image, it may remove or alter the associated metadata. One solution is to store the metadata separately from the image. However, this approach requires that there be a reliable way to link the metadata to the image as it passes from one image processing application or device to the next. Steganographic encoding provides such a link between the image and its metadata. This link is referred to as a persistent steganographic link because it remains part of the image data through various image processing operations, including transfer to and from the analog domain (e.g., printing to image capture).

Figure 3:
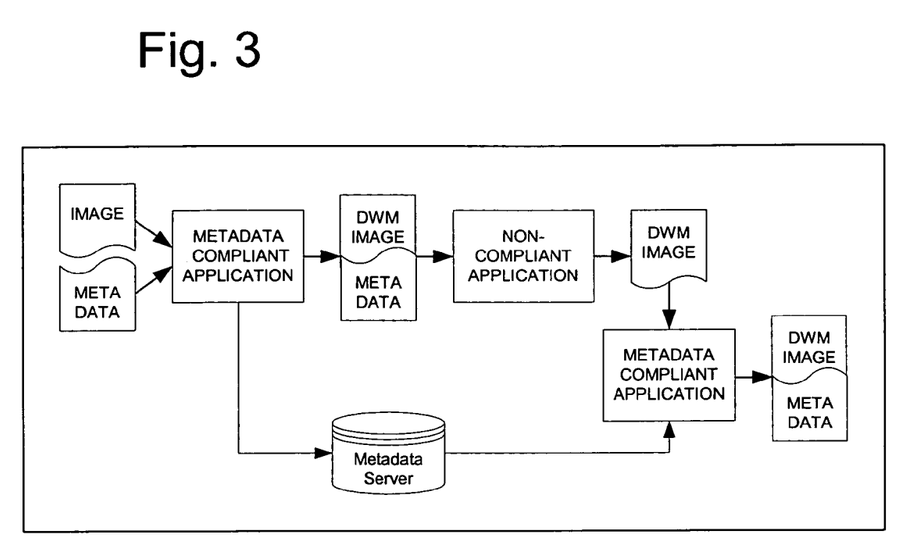
FIG. 3 is a diagram illustrating an application of steganographic links to metadata in images.

FIG. 3 is a diagram illustrating a metadata server application that uses a persistent steganographic link to ensure that various devices and applications that process an image have access to its metadata. This diagram refers to "compliant" and "non-compliant" metadata applications. A compliant application refers to a device or software process that adheres to standard guidelines for maintaining image file metadata. A non-compliant application is a device or process that does not adhere to such guidelines, and may alter the metadata in unintended ways.

Starting from the upper left of FIG. 3, a compliant application adds metadata to the image, and sends the metadata to a metadata server. The server stores the metadata along with a reference (e.g., unique number) to the image. This reference serves as a link to the image, and matches the reference steganographically embedded in the application. This example scenario assumes that the form of steganographic coding is a digital watermark. Either the compliant application, or some other previous process embeds the watermark, including the reference, in the image.

The compliant application produces an image file that includes the digital watermarked image (DWM) and the metadata. One example of such an application is the application for uploading images from cameras or from PCs to a server on the Internet. This application embeds the watermark in the image and forwards the metadata to the metadata server. Note that the server application for uploading images and the metadata server database application may be implemented in the same server or a group of servers.

Next, a non-compliant application gets this file, and removes or corrupts the metadata, leaving only the watermarked image.

Noticing that the image does not have metadata, the next compliant application sends a request to the metadata server for the image's metadata. The compliant application, equipped with a watermark detector, screens the image and extracts the reference to the image's metadata. It then forwards this reference to the metadata server, which returns the metadata. The format of the metadata may be based on XML or some other standard or custom data format. Preferably, the metadata format is sufficiently general to be compatible with many different devices and applications, but this not a requirement. The compliant application produces a new image file, including the watermarked image and its restored metadata.

Metadata Router

Figure 4:
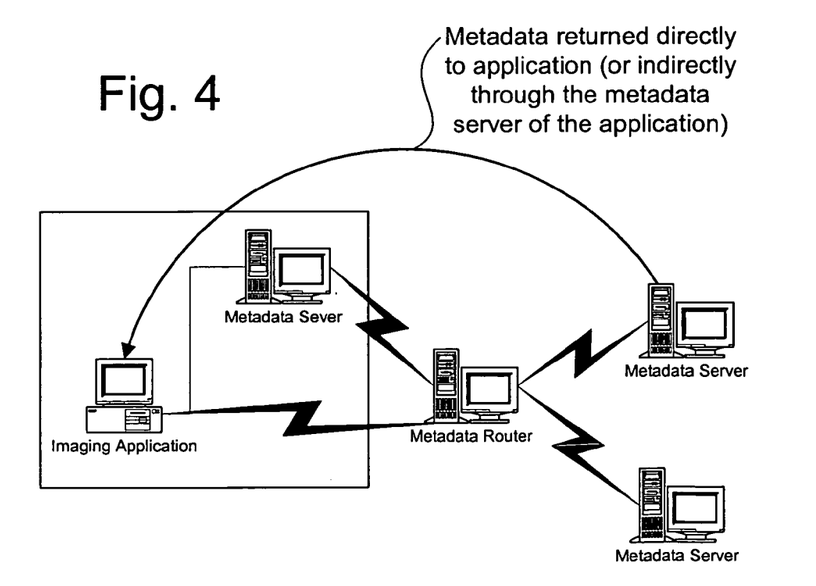
FIG. 4 is a diagram illustrating the use of steganographic links to access metadata from different imaging systems.

This concept can be extended beyond a single system by adding another component, the metadata router. Assume a collection of different systems, each with its own metadata server, and each tracking its own images. FIG. 4 depicts an example of three different systems, each having its own metadata server. Each of the metadata servers handles requests from imaging applications within its system. If an image from one system is acquired by another system, the new system will not have any associated metadata. Therefore, any application in the new system that tries to retrieve metadata from its metadata server will fail; it will find no information. If however, the new metadata server can determine which metadata server does have the information, it can request the image metadata from the other metadata server.

The metadata router is the component that can help resolve which metadata server contains information about a particular image. The metadata router can operate either on a watermarked image, or a reference extracted from an image. In the former case, the requesting system has been unable to detect the metadata reference (e.g., it cannot detect a watermark), and thus, has forwarded the image to the router. The router then performs one or more watermark detection operations to extract the reference, and if successful, maps the extracted reference to the metadata server by using the extracted reference as a key to the metadata server in its database.

In the latter case, the requesting system has extracted the metadata reference, but does not maintain the metadata for that reference. The metadata router maps the reference to the appropriate metadata server by using the reference as a key to the metadata server in its database. It then redirects the request to the metadata server, which returns the requested metadata. The server having the metadata may return the metadata to the metadata server of the system from which the request originated and/or to the requesting application. This system may be implemented on a computer network, such as the Internet, using conventional networking protocols to communicate requests and return data over the network.

The application may also make the request for metadata by requesting the metadata from the metadata router. The router, using the identifying information extracted from the watermark, redirects the request to the appropriate metadata server. The server maps the reference to the image's metadata and returns the requested metadata to the metadata server of the system from which the request originated and/or to the requesting application.

Searching Metadata

The techniques described above provide powerful applications for searching metadata that extend across different imaging applications and systems. For example, a user of an imaging application in one system can send a search request to the metadata server for that system. The search request can direct a search in one more fields of the metadata (e.g., time, place, subject, etc.) in the metadata database. Using the metadata router, the metadata server can extend the search across systems by forwarding the search request to a metadata router, which in turn, forwards the requests to other metadata servers.

In addition, applications can support image based searching. For example, an end user might find an image of interest. The user then issues a request such as: "find other images like this one" (e.g., taken at a similar time, in a similar place, or having a similar subject). The client application or the metadata server extracts the reference from the image watermark. The metadata server then searches its database for images that are similar based on the criteria provided by the user, or based on metadata associated with the image. The metadata server can extend the search to other metadata servers by forwarding the request to other metadata servers via the metadata router. If the user finds an image that is not compatible with the system he is using, the same approach outlined above for finding the image's metadata can be used to find the corresponding metadata server and initiate a database search for related images.

Access to Just Metadata (Independent of the Picture)

The schemes outlined above facilitate access to metadata independent of the picture. By storing the metadata in a metadata database, applications can access, search and transfer the metadata without the images. This is particularly beneficial where bandwidth and storage is limited because the most common form of metadata, text, is usually smaller in size than the associated image. It requires less bandwidth and memory to transmit and store this text separately from its associated image.

Metadata of an image may also be voluminous in some cases. For example, the metadata may include a sound or video annotation. It is advantageous to be able to store, access and search this type of metadata separately.

Metadata Editing (Create, Read, Update, and Delete)

The metadata server scheme outlined above support editing of the metadata associated with an image. To edit an image's metadata, a user may access the metadata by extracting the persistent link to the metadata server and issuing a request to the metadata server. The metadata server implements a scheme for managing the rights to edit (e.g., create, read, update, and delete) the image's metadata. For example, the server may require the user to enter authentication information, such as user name and password. In response, the server determines the editing rights by looking them up in its database. Based on these rights, the user may be granted the authority to create, read, update, or delete the metadata.

Metadata Persistence

Persistent steganographic links to metadata ensure the persistence of an image's metadata through various operations, including file conversion (e.g., changing the file format of the image), file transmission (e.g., sending an image by email, or by wireless transmission), image compression, and image editing. The steganographic data is designed to stay in tact through various forms of image processing.

The persistence of the steganographic link also ensures metadata persistence of various types of data associated with the image, including copyright information. In addition, it supports adding multiple instances of copyright information, for works with multiple owners, and authors. The scheme for managing editing rights described above enables authors who create new works based on existing works to add copyright information to the image. The metadata server may be programmed to notify the copyright owner whenever another author wishes to modify an image. The right to modify a particular image may be pre-specified (e.g., a specified list of authors who have editing rights), or may be requested on a case by case basis. The metadata server may notify the copyright owner by email, for example, asking for authorization to grant editing rights to a particular author. If granted, the metadata server informs the new author of the terms. Then, if the new author excepts the terms by sending a return email or manifesting intent via an interactive web page, for example, the metadata server allows the new author to create a derivative work of the image.

The derivative work inherits the metadata of the original work, including copyright information of the copyright owner in the original work. To associate the metadata for the new image, the metadata server provides a new reference to the new author's imaging application, which in turn, steganographically encodes the new reference in the derivative work. Additionally, the metadata server adds an entry in its database that associates the reference embedded in the new work with its corresponding metadata. This entry may also include a pointer to the database entry for the original work. This scheme for cross referencing earlier works enables the metadata server as well as system users and applications to track the history of an image through various types of editing.

Steganographic linking of images to metadata allows the persistence of an image's metadata to be specified externally by a user, device or application. As noted above, the persistence of metadata is often vulnerable to intentional and unintentional manipulation. It is difficult for a user to specify which items of metadata are to persist with the image, and under which circumstances.

The metadata server allows users, devices and application processes to specify which items of metadata are to remain persistent, through various forms of processing. The metadata servers and routers, having the appropriate authority, may annotate an image's entry or entries in a metadata database to specify which data items will survive specified types of image processing, or image transfers. For example, if one system requests a metadata server to supply metadata to another system via the metadata router, the metadata server will only supply metadata that is designated to be persistent for the specified type of operation on the image.

The steganographic link to metadata also supports the combination of metadata when two or more images are combined. As noted above, the metadata server may issue a new reference to be steganographically encoded in the new, combined image. The server may combine the metadata by combining the metadata for each component image into one metadata database entry, by inserting reference links in the database entry for the new image to the metadata entries for the component images, or some combination of these approaches.

Metadata Format and Processing

The metadata may be specified using the standard Extensible Markup Language, XML, or some other standard or custom format. The XML standard describes a class of data objects called XML documents and partially describes the behavior of computer programs which process them. XML is an application profile or restricted form of SGML, the Standard Generalized Markup Language [ISO 8879]. By construction, XML documents are conforming SGML documents. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure.

A software module called an XML processor is used to read XML documents and provide access to their content and structure. In the implementations based on XML, the XML processor processes raw XML data on behalf of other application programs, such as an image processing application or a metadata server application. For more information on XML and XML processors, see the XML Standard document, Version 1.0, by the World Wide Web Consortium.

Metadata Security and Authentication

The metadata associated with an image may be secured and authenticated at various stages of processing. These processing stages include: at or shortly after image capture in the camera, upon uploading the image from the camera, within the metadata server, and during transfers of the metadata from one device, application or system to another. One way to secure the metadata is to encrypt it. Another way is to restrict access to it via the metadata server such that only authenticated users, applications, and devices have access to it. Yet another way is to create a digital signature of the metadata, such as by performing a secret hash function on the data to derive a unique signature. This signature can be recomputed for suspect metadata and compared with a signature stored in the metadata database or elsewhere to determine whether the metadata has been modified.

Other Applications

With the growth in popularity of digital image capture devices, there is a growing demand for photo processing and storage services for digital images. Several companies now offer photo-processing services accessible via the Internet. These services create prints of digital photos sent via the Internet and mail the prints to the customer. A related service is providing an on-line database of images. Such services enable customers to maintain a collection of photos in an accessible database, e.g., an on-line database on the Internet.

The metadata database applications described above provide an effective way to manage data associated with images. These applications are particularly applicable to the Internet, where the database information may be made available to a variety of users, imaging devices, application processes and systems.

The image metadata may be maintained in a separate database or in a database integrated with an image database that stores the images themselves. The image database may contain a private collection of photos or collections of photos from unrelated users.

A related application to maintaining image and metadata databases is tracking transactions involving the images or their metadata. The image or metadata database may keep a history or log file of the transactions associated with an image. For example, as users request processing services on photos, such as creating prints, putting the prints on objects (e.g., shirts, cups, calendars, posters etc.), etc., a tracking application keeps a record of the transaction, listing attributes of the transaction like the date, vendor, service provided, and images subject to the service. The transaction history may then be linked with other metadata and the image itself by a reference, such as the steganographic link embedded in the image. There are a variety of other ways to link the transaction history with an image. For example, the transaction history may be stored in an entry in the metadata or image database associated with the image.

These applications may also be implemented for other media signals, such as audio, video, graphical models, etc. as explained below.

Other Media Signal Types

The technology described above relating to persistent links in images also applies to other media signals, including audio, and video signals, and computer graphics models (e.g., two-dimensional, three-dimensional graphical models and animation). Video is just another form of an image signal, so the same technology applies to embedding, reading and using links and metadata steganographically encoded into video signals. Steganographic processes may also be applied to audio signals as described in the patent documents incorporated by reference in this document. As such, the same applications may be implemented for audio by embedding metadata and/or a persistent link to metadata in an audio signal.

Much of the technology discussed above directly pertains to still image capture devices as well as video capture devices, so no further elaboration is required. Generally speaking, metadata or a persistent link to metadata may be steganographically encoded into a video signal at the time of capture or at some later time and location. A video capture device may be adapted to insert a steganographic link in one or more video frames as the video signal is being captured, or shortly thereafter, before the encoded signal is transferred from the device. Also, the steganographic link may be inserted in the video signal as it is being transferred to an external device, such as a computer either directly linked or indirectly linked through a communication network (e.g., the Internet).

Similarly, metadata or a persistent link to metadata may be steganographically encoded into an audio signal at the time of capture or at some later time and location. An audio capture device (e.g., an analog or digital audio recording device) may be adapted to insert a steganographic link in one or more audio segments as the audio signal is being captured, or shortly thereafter, before the encoded signal is transferred from the device. Also, the steganographic link may be inserted in the audio signal as it is being transferred to an external device, such as a computer either directly linked or indirectly linked through a communication network (e.g., the Internet).

Once inserted in the media signal, a decoder can then extract the metadata or persistent link to metadata from the media signal. Once a steganographic decoder extracts the link to metadata or metadata itself, the same applications described above for retrieving, processing and using metadata apply. For example, the metadata server and router systems may be adapted to store and control access to metadata for media signals other than images. The same metadata applications that exploit steganographic data for images apply to other media signals as well.

More on Metadata

As noted above, metadata may be steganographically encoded in media signals such as image, audio and video signals. In particular, metadata may be encoded into a digital watermark embedded in a host media signal.

One form of metadata that may be encoded in such a watermark is a metadata digest. One type of a metadata digest provides a synopsis of the metadata associated with a media object. For example, it may include descriptors of the names or types of metadata associated with the media signal. These descriptors can be in the form of alphanumeric or numeric identifiers. The digest may also include an abbreviated version of each type or selected types. Software programs or devices can extract this digest with a watermark decoder to determine the types of metadata associated with a media signal. Based on the information in the digest, the extracting process can decide how to act on the metadata. One action is to display the digest to the user, and enable the user to decide whether to access the complete metadata via a link to the metadata (e.g., a URL, or dynamic index to a database entry in a local or remote, networked computer system). Another action is to control the processing of the media signal, such as rendering, compression, encryption, editing, etc.

Another form of a metadata digest for encoding in a watermark is a hash of the metadata associated with the watermarked media signal. A variety of known hashing techniques may be used to convert a binary form of the metadata to a hashed metadata digest. A watermark encoder then encodes this hashed metadata into a watermark and embeds the watermark in a host media signal. At decoding time, the hashed metadata may be used to access a complete version of the metadata. For example, the hashed metadata may be used as a database key to look up the associated metadata in a metadata database.

Additionally, the hashed metadata from the watermark may be used to authenticate a copy of the metadata stored outside the media signal. The hashing function used to create the watermark message is applied to the metadata stored outside the media signal. The resulting hashed metadata is then compared with the metadata decoded from the watermark in the media signal to check authenticity of the metadata. As noted above, the metadata may be stored outside the media signal, such as in a file header of a file containing the media signal, a metadata database, etc. For many applications, there is a need to establish the metadata stored externally is the same as the metadata that was originally associated with the media signal and recorded in the watermark embedded in the media signal. The metadata digest provides a mechanism for authenticating the metadata for these applications.

As noted above, time stamps and location stamps are additional forms of metadata that may be encoded into a watermark signal and embedded into an associated media signal. The time stamp can be used to mark several types of events, including, but not limited to:

the time of media signal creation or editing, the time of watermark encoding into the media signal, the time of metadata association with the media signal, the time of transfer of the media signal or metadata from one device to another, etc.

The source of the time stamp varies with these types of time stamp uses. The time may be supplied by the media signal capture device, such as camera or audio recording device. Alternatively, it may be supplied by a media signal editing program or device, a media signal transmission program or device, a metadata creation or editing program or device, a watermark encoder program or device. In sum, the device or program operating on the media signal or metadata may supply the time stamp to mark the time that the device or program processed the media signal, its metadata, or the watermark in the media signal.

The location stamp may be used in the same contexts and applications as the time stamp. A global positioning device or other provider of location may supply the location data included in the stamp. Also, the time and/or location stamp may be included in the metadata digest, either in hashed or unhashed form.

Another way to authenticate metadata is to use corresponding sets of time or location stamps in the metadata and the watermark within the media signal with which the metadata is associated. In particular, the time stamp clock may provide a time stamp for the watermark message, which may include metadata or a metadata digest, and then provide a corresponding time stamp for metadata stored externally. The time stamp in the watermark may then be compared with the time stamp in the external metadata to determine whether the time matches. Similarly, changes to the media signal or metadata may be time stamped in the watermark and in the external metadata. This provides a mechanism to synchronize changes to the metadata or media signal with each other.

As noted previously, additional processing may be applied to the metadata before encoding it into a watermark and embedding the watermark in a host media signal. One form of processing is data compression. The metadata may be compressed and inserted into a watermark in the media signal. Data compression effectively increases the data capacity of the watermark. In addition, the metadata may be encrypted and inserted into a watermark in the media signal. Encryption reduces or even eliminates tampering with the metadata. In addition, it can be used in conjunction with digital signature technology to authenticate the metadata and its source.

Similarly, metadata stored externally to the media signal may be compressed and/or encrypted as well.

The specific types of compression applied to the metadata are preferably, but not necessarily, data specific to the type of the metadata. Some applications may require metadata to include text, sound, images, video, graphics, and various combinations of these types of data. Text compression codecs may be used to compress and decompress text. Voice data compression codecs may be used to efficiently compress and decompress voice data. Image and video compression codecs may be used to efficiently encode and decode images and video. Audio compression designed for compressing music may be used to compress music files. For metadata in the form of imagery such as still images or video, examples of compression codecs include JPEG, JPEG 2000, MPEG, and H263. For metadata in the form of audio such as music, examples of compression codecs include MPEG (ISO/IEC 14496-3:1999 (MPEG-4 AAC); ISO/IEC 11172-3:1993 Layer III (MPEG-1 Audio Layer 3 "MP3")), ISO/IEC 13818-7:1997 ("AAC"), Q-Design, Windows Media Audio, Twin-VQ, ATRAC-3, Dolby Digital AC-3 ATSC A_52, and ePAC.

Other types of lossy or lossless data compression may be used. Some examples of entropy coding include arithmetic and Huffman coding. Run length encoding and LZ compression may also be used to compress metadata.

Through the use of compression, more types of metadata can be embedded in a watermark within a media signal. For example, an image can carry its own sound data. Consider the case where an image is embedded with a watermark and printed. As part of the embedding process, a sound (such as a voice instruction or comment) can be compressed and embedded into the image's watermark. At decoding time, a camera captures an image, and a watermark decoder extracts the watermark message from the captured image and invokes a decompression program or device to decode and play the sound. In effect, the printed object talks to the user by virtue of the voice data encoded into the printed image.

Additional metadata may be stored in video because each frame provides another opportunity to convey a different message in a watermark for that frame. Similarly, voice or other data may be compressed and encoded within audio frames (discrete segments of an audio sequence) of a music file. This voice data can be decoded and played to announce the title of the song or provide other information associated with it.

Encryption may be used to encrypt metadata encoded in a watermark and stored externally to the media signal. Some examples of public key cryptography include RSA, DES, IDEA (International Data Encryption Algorithm), skipjack, discrete log systems (e.g., El Gamal Cipher), elliptic curve systems, cellular automata, etc. Public key cryptography systems employ a private and public key. The private key is kept secret, and the public key is distributed to users.

One use of encryption is prevent tampering with metadata. Without an encryption key, a user or device cannot access metadata that has been encrypted. Metadata embedded in a media signal via a watermark and stored externally can be encrypted. Later, to check authenticity of the metadata, a device or application with the key decrypts the metadata from the watermark and from an external source. Then the decrypted metadata from both sources is compared to check for differences in the metadata that evince tampering. It also possible to perform metadata authentication by encrypting one or the other of the metadata in the watermark or metadata stored externally to the media signal. The decrypted metadata may be compared with the metadata that has not been encrypted to check for differences that evince tampering.

Encryption techniques may be used to create a digital signature that identifies the source of the metadata or media signal. To digitally sign metadata or media signal, the originator of the metadata encrypts the metadata with a private key. The private key is uniquely associated with the originator. Those users, devices or programs having a corresponding public key verify that the metadata has originated from the holder of the private key by using the public key to decrypt the metadata. If the metadata can be decrypted with the public key, then some indicator can be displayed or output indicating that the metadata is valid (i.e. has been encrypted with the private key). This form of authenticating metadata with a digital signature applies to metadata within a watermark in a media signal or stored externally to the media signal. Authentication of a digital signature can be integrated with the process of decoding a watermark message.

Encryption is a particularly useful way of ensuring that sensitive metadata is not tampered with. Some examples of sensitive metadata include time stamps, location stamps, metadata digests, content signatures or metadata signatures. For some applications, there is a compelling need for the user of a media signal to be able to prove that the metadata is accurate. By encrypting the metadata, or at least the sensitive portion, it significantly reduces the chances that encrypted metadata will be tampered with. If the encrypted metadata is tampered with, it is more likely that the tampering will be apparent when it is attempted to be decrypted or when it is compared with another copy of the metadata.

A content signature is type of metadata used to define some distinguishable and identifying attributes of a media signal. For example, it may be a hash of a media signal, such as a representation of salient features of an image (eyes and nose locations of a person's photo) or sound file (a statistical features like average energy, autocorrelation with set delay, power, frequency coefficients, or other salient features like locations of high to low energy transitions, etc), a low pass filtering of the image or audio samples, the most significant bits of the image or audio, etc. The content signature may be computed and stored in metadata. Then, to authenticate a media signal, the content signature is recomputed and compared with the content signature in the metadata. Differences between these signatures are output to the user as an indicator of the validity of the metadata or the content.

A metadata signature is a type of metadata used to define some distinguishable and identifying attributes of a media signal's metadata. Similar to the content signature, the metadata signature may be a hash used to authenticate the validity of the metadata. The metadata signature may be computed and stored along with metadata at the time of creation or editing of the metadata or the associated media signal. Like the content signature, it may be encoded in a watermark in the media signal, stored externally to the media signal, or both. To check the validity of the metadata, the hash is recomputed for the metadata in question and compared with the previously computed metadata signature. Differences may be displayed or otherwise output to the user as evidence of tampering.

The preceding sections describe several methods for encoding metadata into media signals and for authenticating the metadata. Various combinations of these methods may be readily implemented based on the above disclosure. For example, metadata may be compressed, digitally signed, encrypted and encoded into a watermark within the associated media signal. In a decoding process, the metadata may be decoded from the watermark, decrypted, verified by its digital signature, decompressed, etc. Elements of the metadata in the watermark may be used to authenticate the media signal. Also, the metadata may be compared and analyzed with respect to a version of the metadata stored externally the media signal, whether in the file header of the media signal, in a remote metadata database, or elsewhere. Various combinations, sub-combinations and arrangements of these processing stages are possible too. The metadata may include a metadata digest, time stamp, location stamp, content signature, metadata signature, or any combination of these and other metadata types. The detailed description of an implementation for image capture devices applies to other types of devices and programs for creating or editing other media signal types. In place of the image capture device in FIGS. 1 and 2, for example, one could substitute a device, system or application for capturing, editing or creating other media signals. Each of the operations for associating and processing metadata that apply to images also apply to other media signals.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. Additional information is attached in Appendix A, entitled "DIG35 Metadata and Digital Watermarking by Digimarc Corporation, which is also incorporated by reference. The technology for linking images to metadata described in appendix A may also be applied to media signals other than images, such as audio signals or graphics.

The particular combinations of elements and features in the above-detailed embodiments are exemplary only; the interchanging and substitution of these teachings with other teachings in this and the incorporated-by-reference patents/applications are also contemplated.

I claim:

1. A method for processing metadata of a media signal comprising:
   providing a metadata digest for the media signal; and
   embedding metadata steganographically in the media signal wherein the metadata in the media signal includes a metadata digest, and wherein the metadata digest includes descriptors of external metadata about the media signal, where the external metadata is stored in a database external to the media signal.

2. The method of claim 1 wherein the descriptors provide an abbreviated version of the external metadata.

3. The method of claim 1 wherein the steganographically embedded metadata includes an index to the external metadata stored in the database.

4. The method of claim 1 including:
   extracting the metadata from the media signal; and
   displaying descriptors of the external metadata.

5. The method of claim 4 including:
   displaying a link to the external metadata;
   in response to selection of the link, fetching the external metadata associated with the link.

6. A method for processing metadata of a media signal comprising:
   computing a content signature of the media signal; and
   embedding metadata steganographically in the media signal; wherein the metadata in the media signal includes the content signature of the media signal, and the content signature comprises a hash of the media signal, and computing the hash includes low pass filtering the media signal.

7. A method for processing metadata of a media signal comprising:
   computing a content signature of the media signal; and
   embedding metadata steganographically in the media signal; wherein the metadata in the media signal includes a content signature of the media signal, and the content signature comprises a hash of the media signal, and computing the hash includes computing salient features of the media signal.

8. A method for processing metadata of a media signal comprising:
   providing metadata associated with the media signal;
   computing a metadata signature of the metadata; and
   embedding metadata steganographically in the media signal wherein the metadata in the media signal includes the metadata signature.

9. The method of claim 8 wherein the metadata signature comprises a hash of external metadata relating to the media signal.

10. The method of claim 9 wherein the external metadata is stored in a file header of the media signal.

11. The method of claim 9 wherein the external metadata is stored in an external database referenced by metadata embedded in the media signal.

12. A method for processing metadata of a media signal comprising:
    providing metadata associated with the media signal, including a time stamp;
    embedding the metadata steganographically in the media signal; wherein the metadata in the media signal includes a time stamp;
    including:
    marking an event of processing the media signal with the time stamp.

13. The method of claim 12 wherein the event comprises editing of the media signal.

14. The method of claim 12 wherein the event comprises encoding a digital watermark into the media signal.

15. The method of claim 12 wherein the event comprises transfer of the media signal from device to another.

16. A method for processing metadata of a media signal comprising:
    embedding metadata steganographically in the media signal, wherein the metadata in the media signal includes a location stamp including:

marking an event of processing the media signal with the location stamp.

17. The method of claim 16 wherein the event comprises editing of the media signal.

18. The method of claim 16 wherein the event comprises encoding of a digital watermark into the media signal.

19. The method of claim 16 wherein the event comprises transfer of the media signal from one device to another.

20. A method for processing metadata of a media signal comprising:

embedding metadata steganographically in the media signal; storing external metadata of the media signal externally to the media signal;

wherein the metadata in the media signal and the external metadata stored externally are related in a manner in which validity of the metadata can be evaluated by comparison.

21. The method of claim 20 wherein the metadata embedded in the media signal includes a hash of the external metadata; and authentication of the external metadata includes:

computing a hash of the external metadata; and comparing the hash of the external metadata with the hash extracted from the metadata embedded into the media signal.

* * * * *